United States Patent
Yuuki et al.

(10) Patent No.: US 8,885,118 B2
(45) Date of Patent: Nov. 11, 2014

(54) ILLUMINATION DEVICE AND LIQUID CRYSTAL DISPLAY HAVING A LIGHT GUIDE PLATE WITH PROTRUSIONS OF MULTIPLE HEIGHTS

(75) Inventors: Akimasa Yuuki, Tokyo (JP); Kenji Itoga, Tokyo (JP); Naoko Iwasaki, Tokyo (JP); Takafumi Kokusho, Tokyo (JP); Yuji Tsuchiyama, Tokyo (JP); Seiji Sakai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/297,708

(22) Filed: Nov. 16, 2011

(65) Prior Publication Data

US 2012/0127400 A1    May 24, 2012

(30) Foreign Application Priority Data

Nov. 24, 2010    (JP) ................................ 2010-261281
Sep. 21, 2011    (JP) ................................ 2011-205829

(51) Int. Cl.
  *G02F 1/1335*    (2006.01)
  *F21V 8/00*    (2006.01)

(52) U.S. Cl.
  CPC ............ *G02B 6/002* (2013.01); *G02B 6/0068* (2013.01)
  USPC .............................................. 349/65; 362/621

(58) Field of Classification Search
  CPC ................................ G02B 6/0016; G02B 6/002
  USPC ............................. 349/65; 362/621–622, 628
  See application file for complete search history.

(56) References Cited

U.S. PATENT DOCUMENTS

| | | | | |
|---|---|---|---|---|
| 8,556,493 B2 * | 10/2013 | Suma | ............................ | 362/621 |
| 8,727,594 B2 * | 5/2014 | Ando et al. | ................... | 362/608 |
| 2006/0164863 A1 * | 7/2006 | Chang et al. | .................. | 362/621 |

(Continued)

FOREIGN PATENT DOCUMENTS

| | | |
|---|---|---|
| JP | 10-293202 | 11/1998 |
| JP | 2005-158387 A | 6/2005 |

(Continued)

OTHER PUBLICATIONS

U.S. Appl. No. 13/349,749, filed Jan. 13, 2012, Kokusho.

(Continued)

*Primary Examiner* — Mark Robinson
*Assistant Examiner* — Zachary A Nemtzow
(74) *Attorney, Agent, or Firm* — Oblon, Spivak, McClelland, Maier & Neustadt, L.L.P.

(57) ABSTRACT

It is an object of the invention to provide a technique capable of suppressing variations in luminance in the vicinity of a light entrance surface of a light guide plate. An illumination device includes a point light source, and a light guide plate having a side surface serving as a light entrance surface opposed to the point light source, and a main surface serving as a light exit surface. The light entrance surface of the light guide plate is provided with unevenness formed by arraying at predetermined pitches a plurality of protrusions each projecting from the light entrance surface and extending in a direction perpendicular to the light exit surface. Each of the top surface and the bottom surface of the unevenness is provided with a plurality of micro protrusions each extending in the direction perpendicular to the light exit surface and having a height smaller than the above protrusion.

7 Claims, 13 Drawing Sheets

(56) References Cited

U.S. PATENT DOCUMENTS

| | | |
|---|---|---|
| 2007/0051960 A1* | 3/2007 | Yu .................................. 257/88 |
| 2011/0002142 A1 | 1/2011 | Yuuki et al. |
| 2011/0063875 A1* | 3/2011 | Yang et al. .................... 362/621 |

FOREIGN PATENT DOCUMENTS

| | | |
|---|---|---|
| JP | 2006-4645 | 1/2006 |
| JP | 2006-172938 A | 6/2006 |
| JP | 2006-210140 A | 8/2006 |
| JP | 2008-257900 A | 10/2008 |

OTHER PUBLICATIONS

U.S. Appl. No. 13/389,520, filed Feb. 8, 2012, Sakai.
U.S. Appl. No. 13/577,263, filed Aug. 6, 2012, Sakai.
U.S. Appl. No. 14/162,254, filed Jan. 23, 2014, Sakai.
Office Action issued Jul. 29, 2014 in Japanese Patent Application No. 2011-205829 (with English Translation).

* cited by examiner

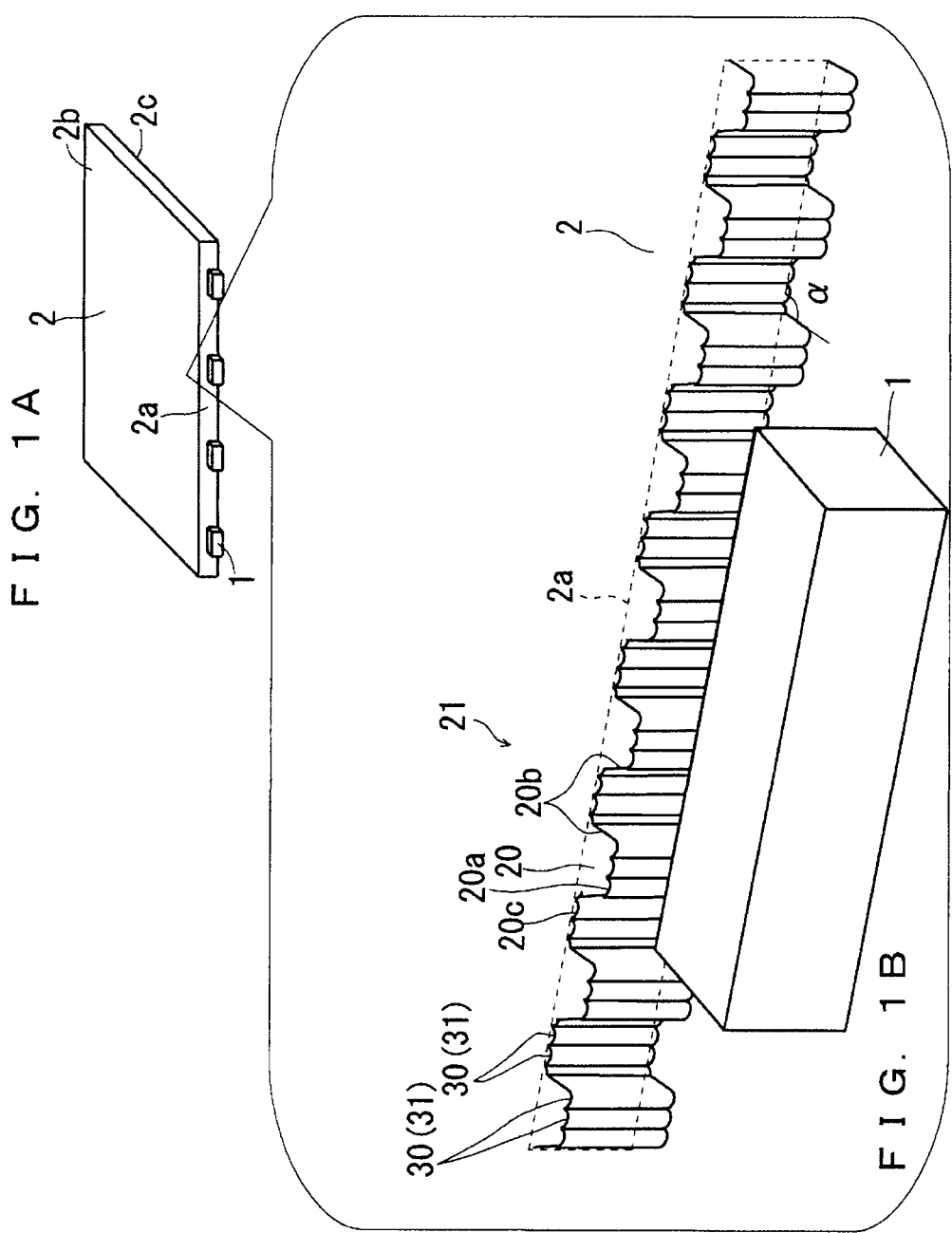

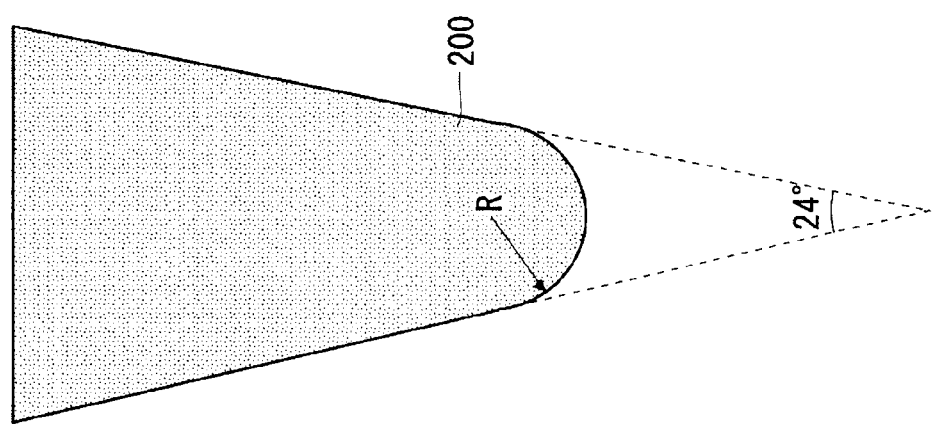
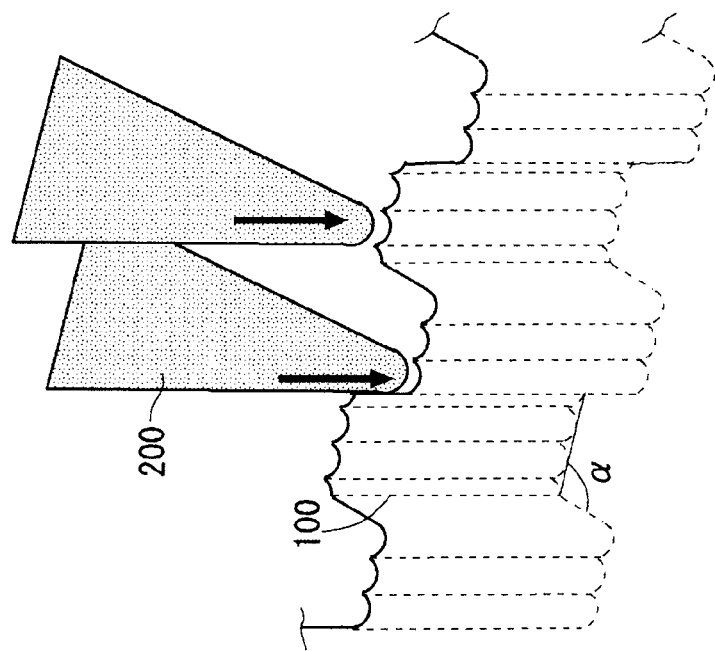
FIG. 2B
FIG. 2A

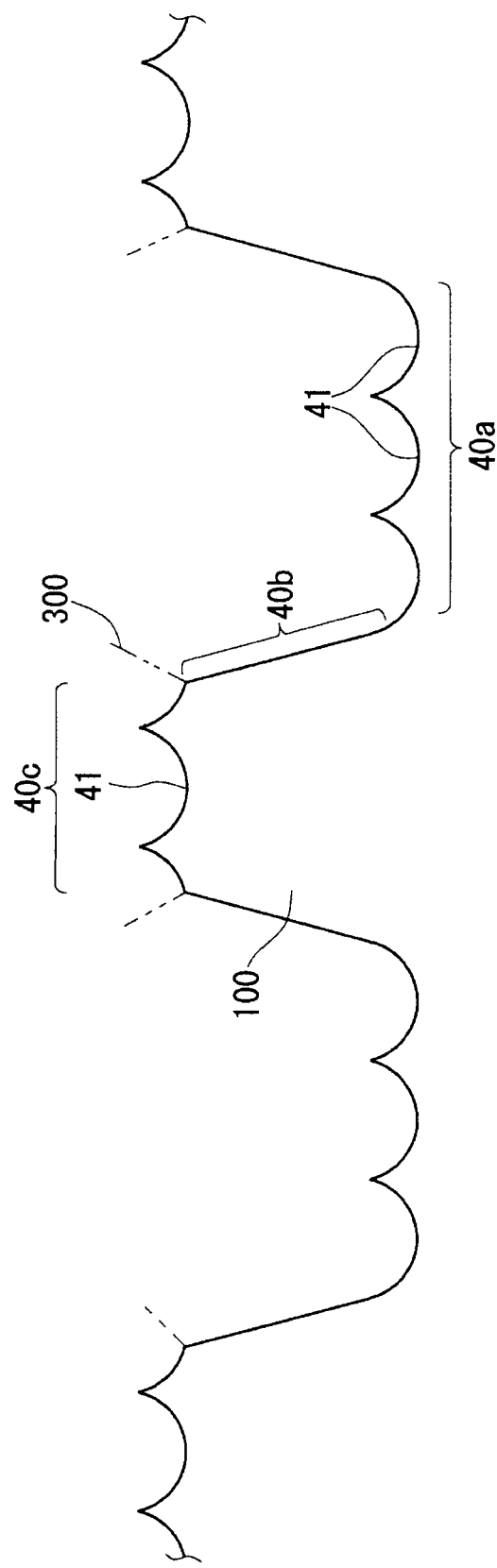

F I G . 1 7
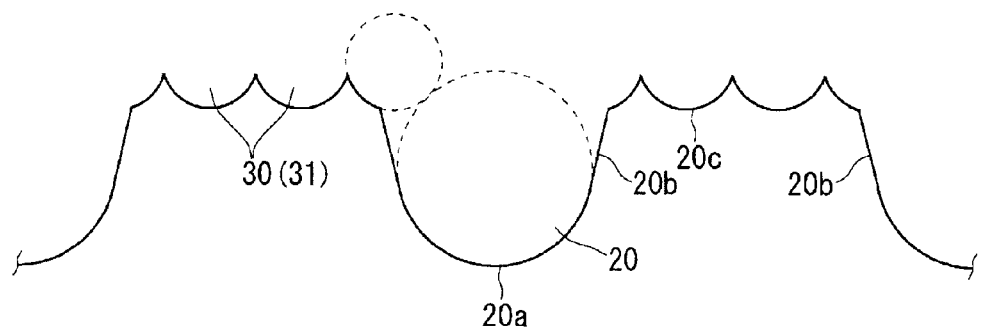
F I G . 1 8
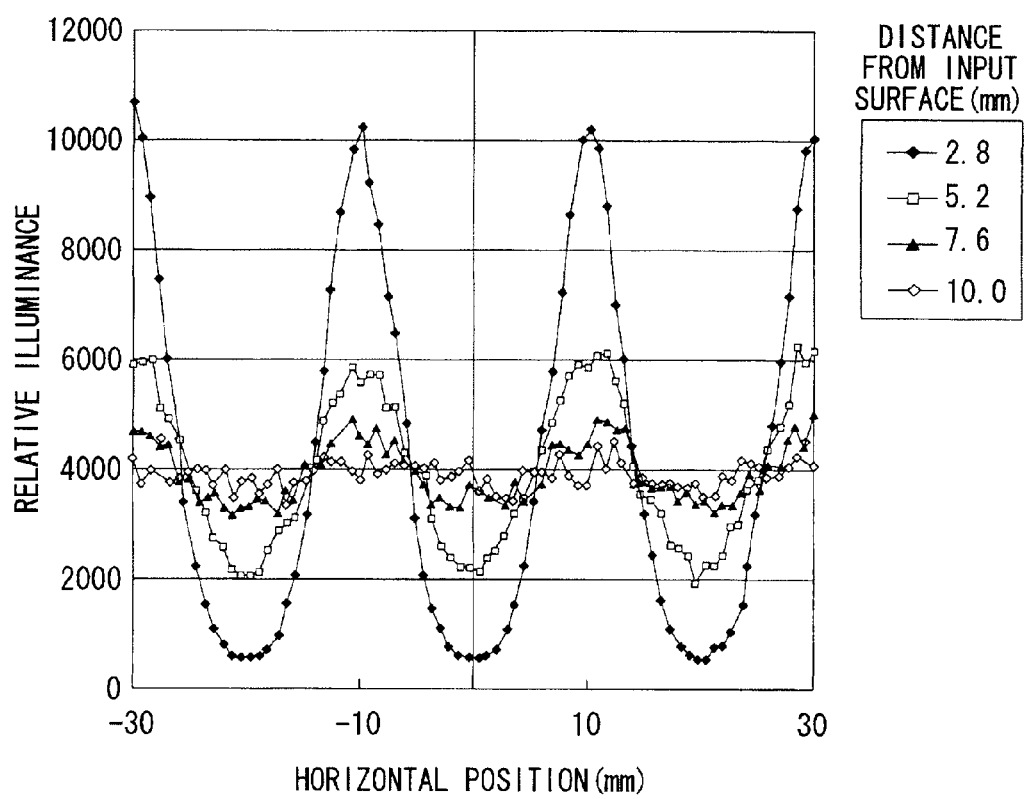

ILLUMINATION DEVICE AND LIQUID CRYSTAL DISPLAY HAVING A LIGHT GUIDE PLATE WITH PROTRUSIONS OF MULTIPLE HEIGHTS

BACKGROUND OF THE INVENTION

1. Field of the Invention

The present invention relates to an illumination device including with a point light source and a light guide plate, and a liquid crystal display.

2. Description of the Background Art

Various inventions have been made regarding an illumination device that emits light. For example, Japanese Patent Application Laid-Open No. 2006-4645 describes a planar illumination device, which includes a light guide plate and a point light source arranged along the side end surface of the light guide plate, and emits light from the main surface of the light guide plate. The side end surface where the point light source is arranged is provided with a plurality of stripe projections projecting from the side end surface and extending in a thickness direction of the light guide plate, and each of the stripe projections includes a pair of flat surfaces symmetrically inclined in the width direction of the stripe projection and a curved surface connecting the tip sides of the pair of flat surfaces.

According to such an illumination device, light incident on the stripe projection from the point light source is refracted by a structural surface of the stripe projection and dispersed inside the light guide plate in a wide range, so that the light emitted from the main surface of the light guide plate can be made uniform. Furthermore, the surface of the stripe projection includes the pair of flat surfaces symmetrically inclined in the width direction of the stripe projection, and a curved surface connecting the pair of flat surfaces, and since a refraction angle of light incident on the light guide plate from the point light source is different between the flat surface and the curved surface, it is possible to obtain an optimal balance between light diffusion and luminance enhancement.

However, in the planar illumination device described in Japanese Patent Application Laid-Open No. 2006-4645, on the side end surface of the light guide plate that is opposed to the point light source, a front portion of the point light source has high luminance but a portion therebetween has low luminance. This tendency is particularly significant when the interval between the point light sources is large, resulting in a problem in that luminance in the vicinity of the side end surface (light entrance surface) of the light guide plate becomes nonuniform.

SUMMARY OF THE INVENTION

It is an object of the invention to provide a technique capable of suppressing variations in luminance in the vicinity of a light entrance surface of a light guide plate.

The present invention is an illumination device, which includes a point light source, and a light guide plate having a side surface serving as a light entrance surface opposed to the point light source and a main surface serving as a light exit surface. The light entrance surface of the light guide plate is provided with unevenness formed by arraying at predetermined pitches a plurality of first protrusions each projecting from the light entrance surface and extending in a direction perpendicular to the light exit surface. Each of the top surface and the bottom surface of the unevenness is provided with a plurality of second protrusions each extending in the direction perpendicular to the light exit surface and having a height smaller than the first protrusion.

Each of the top surface and the bottom surface of the unevenness is provided with the second protrusions. Accordingly, it is possible to sufficiently refract light from the point light source on each of the top surface and the bottom surface, and thereby suppressing variations in luminance in the vicinity of the light entrance surface of the light guide plate.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 1A and 1B are diagrams showing a configuration of an illumination device according to a first preferred embodiment;

FIGS. 2A and 2B are diagrams showing a state of processing a mold for injection-molding a light guide plate of the illumination device;

FIG. 3 is a top view showing a mold for injection-molding the light guide plate of the illumination device;

FIG. 17 is a diagram showing a configuration of an illumination device according to a second preferred embodiment;

FIG. 18 is a diagram showing a result of geometrical optics simulations of the illumination device according to the second preferred embodiment.

DESCRIPTION OF THE PREFERRED EMBODIMENTS

First Preferred Embodiment

Figure 4:
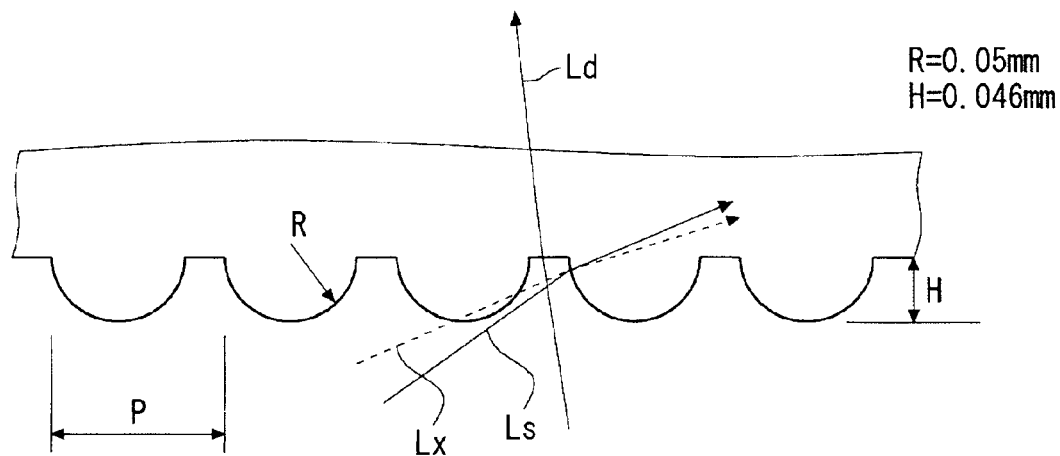
FIG. 4 is a diagram showing a light guide plate related to a light guide plate according to the present preferred embodiment.

FIGS. 1A and 1B are diagrams showing a configuration of an illumination device according to a first preferred embodiment of the present invention. In FIG. 1A, a schematic view of the illumination device is shown, and in FIG. 1B, an enlarged view of a part of the illumination device is shown.

As shown in FIGS. 1A and 1B, the illumination device according to the present preferred embodiment includes a plurality of point light sources 1 and a light guide plate 2 having a rectangular shape in a plan view.

The plurality of point light sources 1 are arranged spaced apart from one another in a longitudinal direction of the light guide plate 2 along a side surface 2a of the light guide plate 2. For example, a light emitting diode (LED) is used for each of the plurality of point light sources 1. Although the term "point light source 1" includes the term "point", this means that it is a "point" when seen in a macro view, and the point light source 1 may not have a "point" shape when seen in a micro view, for example as shown in FIGS. 1A and 1B.

The light guide plate 2 has a side surface 2a serving as a light entrance surface opposed to the point light source 1, and a main surface 2b serving as a light exit surface. Specifically, the light guide plate 2 has the main surface 2b serving as the light exit surface that emits light in the light guide plate 2 to the outside, and a main surface 2c serving as a back surface opposed thereto. The light guide plate 2 has the side surface 2a, which is located between the main surface 2b and the main surface 2c, as the light entrance surface through which light of the point light source 1 enters into the light guide plate 2. In addition, in the case where the plurality of point light sources 1 are arranged opposed to a plurality of side surfaces of the light guide plate 2, the plurality of side surfaces, to which the plurality of point light sources 1 are oppositely arranged, serve as the light entrance surfaces.

Hereinafter, the side surface 2a, the main surface 2b, and the main surface 2c may be referred to as a "light entrance surface 2a", a "light exit surface 2b" and a "back surface 2c", respectively, for the sake of making easier understanding. The light guide plate 2 is manufactured, for example, by performing projection molding by means of a later-mentioned mold on a transparent resin having a refractive index of 1.4 to 1.6, such as acryl or polycarbonate.

The light entrance surface 2a of the light guide plate 2 is provided with a plurality of protrusions 20 (first protrusions) each projecting from the light entrance surface 2a and extending in a direction perpendicular to the light exit surface 2b. Then, the plurality of protrusions 20 are arrayed spaced apart from one another at predetermined pitches along a longitudinal direction of the light guide plate 2 so that unevenness 21 are formed on the light entrance surface 2a. In addition, although the pitch between the mutually adjacent protrusions 20 is on the order of from 0.10 to 0.24 mm in the present preferred embodiment, the present invention is not limited thereto, and as long as the pitch is on the order of a fraction of a width of the light emitting surface of the point light source 1, variations in optical characteristics caused by variations in relative positions of the point light source 1 and the protrusion 20 is suppressed, and assembly of the illumination device is facilitated.

The unevenness 21 has a top surface 20a and side surfaces 20b which constitute each of the protrusions 20, and a bottom surface 20c located between the mutually adjacent protrusions 20. When the light entrance surface 2a is seen in a front view, the top surface 20a can be said as a front surface located on the front side, and the bottom surface 20c can be said as a back surface located on the back side.

Each of the top surface 20a and the bottom surface 20c of the unevenness 21 is provided with a plurality of micro protrusions 30 (second protrusions) each extending in a direction perpendicular to the light exit surface 2b and having a height smaller than the protrusion 20. In a plan view of the light guide plate 2, the plurality of micro protrusions 30, which are provided on the top surface 20a and the bottom surface 20c, each has a semicircular shape of an identical size (radius of 20 µm). In the following description, the micro protrusion 30 may be referred to as "semicircular protrusion 31".

The illumination device according to the present preferred embodiment as thus configured has a double structure made up of the macro protrusions 20 and the micro protrusions 30 (semicircular protrusions 31). Accordingly, even if the plurality of point light sources 1 are greatly spaced apart from one another, it is possible to suppress variations in luminance in the vicinity of the light entrance surface 2a that is opposed to the plurality of point light sources 1. This will be described in detail later.

The side surface 20b included in the unevenness 21 connect between the top surface 20a and the bottom surface 20c. In the present preferred embodiment, an angle α formed by the side surface 20b and the bottom surface 20c is not smaller than 90 degrees and not larger than 110 degrees (e.g., 102 degrees). The closer this angle α is to a right angle (90 degrees), the larger a refraction angle of light on the side surface 20b becomes, and it is thereby possible to improve a luminance decrease in the portion between the point light sources. Accordingly, the angle α is desirably the right angle from the viewpoint of improvement in optical performance. However, by making the angle α slightly larger than the right angle, a mold for injection-molding the light guide plate 2 can be easily processed.

A diamond bite 200 for performing cutting processing on a mold 100 is shown in FIG. 2A, and a state of the mold 100 being subjected to the cutting processing by using the diamond bite 200 is shown in FIG. 2B. For example, when the mold 100 is processed by using the diamond bite 200 having a vertex angle of 24 degrees shown in FIG. 2A, and the light guide plate 2 is projection-molded by using the mold 100, the angle α of the light guide plate 2 is 102 degrees (=90+24/2). In this manner, when the diamond bite 200 for performing the cutting processing on the mold 100 has a vertex angle, the processing of the mold 100 is facilitated.

As described above, the light entrance surface 2a of the light guide plate 2 according to the present preferred embodiment is provided with the semicircular protrusion 31 having a semicircular shape with a radius of 20 µm. As shown in FIG. 2B, when the mold 100 is processed by using the diamond bite 200 having a semicircular shape with a radius of 20 µm at its tip and the light guide plate 2 is projection-molded by using the mold 100, the semicircular protrusion 31 having a semicircular shape with a radius of 20 µm can be formed on the light entrance surface 2a of the light guide plate 2.

To sum up, when the mold 100 is processed by using the diamond bite 200 having a vertex angle larger than 0 degrees and smaller than 40 degrees and having at its tip a semicircular shape with a radius of 20 µm, it is possible to projection-mold the light guide plate 2 where the angle α is larger than 90 degrees and smaller than 110 degrees and the plurality of semicircular protrusions 31 each having the semicircular shape with a radius of 20 µm. In this case, since the diamond bite 200 has a vertex angle, the mold 100 can be easily processed. Further, since the desired mold 100 can be processed only by one type of diamond bite 200, it is possible to suppress costs for the diamond bite, and the time required for performing the cutting processing on the mold 100 can be reduced.

In addition, although a curvature radius of each of the semicircular protrusions 31 provided on the top surface 20a and the bottom surface 20c is not limited to 20 µm, if the curvature radius is too small in the case of manufacturing the light guide plate 2 by projection molding, transcription properties are deteriorated to some extent. Therefore, the curvature radius of the semicircular protrusion 31 is desirably not smaller than 10 µm.

Further, instead of the above projection molding, there is also a method for manufacturing the light guide plate 2 having the unevenness 21 formed on the side surface 2a by forming the unevenness 21 on the surface of a film by using a UV cured resin and pasting the film to the light guide plate with a flat side surface, although the cost increases. According to such a manufacturing method for the light guide plate 2, it is possible to set the curvature radius of the semicircular protrusion 31 to 0.1 µm, but for expressing a geometrical optical function, it is desirable to set the curvature radius to not smaller than the order of 1 µm.

FIG. 3 is a top view of the mold 100. As shown in FIG. 3, the mold 100 is provided with a top surface molding part 40a, a side surface molding part 40b, and a bottom surface molding part 40c respectively capable of molding the top surface 20a, the side surface 20b, and the bottom surface 20c of the light guide plate 2. Then, a semicircular molding part 41 capable of molding the semicircular protrusion 31 is provided on each of the top surface molding part 40a and the bottom surface molding part 40c.

Herein, when an angle formed by the surface of the semicircular molding part 41 of the bottom surface molding part 40c and the surface of the side surface molding part 40b is an acute angle smaller than 60 degrees, a mold fin 300 indicated by an imaginary line (chain double-dashed line) in FIG. 3 tends to be generated. The mold fin 300 exerts an adverse effect on the shape of a molded article (light guide plate 2), and cause deterioration in optical performance thereof. Therefore, in order to prevent generation of the mold fin 300 at the time of cutting processing on the mold 100, the angle formed by the surface of the semicircular molding part 41 of the bottom surface molding part 40c and the surface of the side surface molding part 40b is preferably not smaller than 60 degrees, and the angle is more preferably an obtuse angle.

In the illumination device according to the present preferred embodiment, even when the small number of the point light sources 1 is used and the interval between the point light sources 1 is large, it is possible to suppress variations in luminance in the vicinity of the light entrance surface 2a of the light guide plate 2. The following describes considerations made before the illumination device according to the present preferred embodiment having such an effect has been achieved, and results of simulations associated therewith.

FIG. 4 is a diagram showing a light guide plate related to the light guide plate 2 according to the present preferred embodiment. As shown in FIG. 4, the light guide plate has a thickness of 2 mm, and the light entrance surface thereof is provided only with a plurality of semicircular protrusions having the identical size (radius R=0.05 mm, height H=0.046 mm). Research has been conducted by geometrical optics simulation on how a relative illuminance of such a light guide plate changes in accordance with a pitch of the semicircular protrusion.

Figure 5:
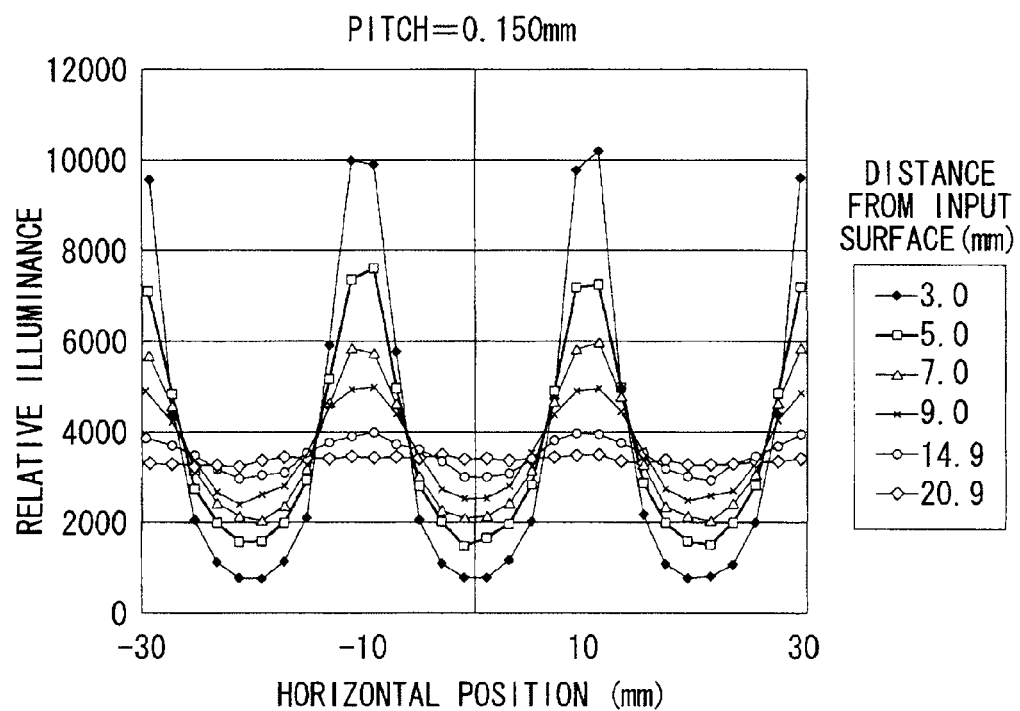
FIGS. 5 to 8 are diagrams each showing a result of geometrical optics simulations of the related light guide plate.
Figure 6:
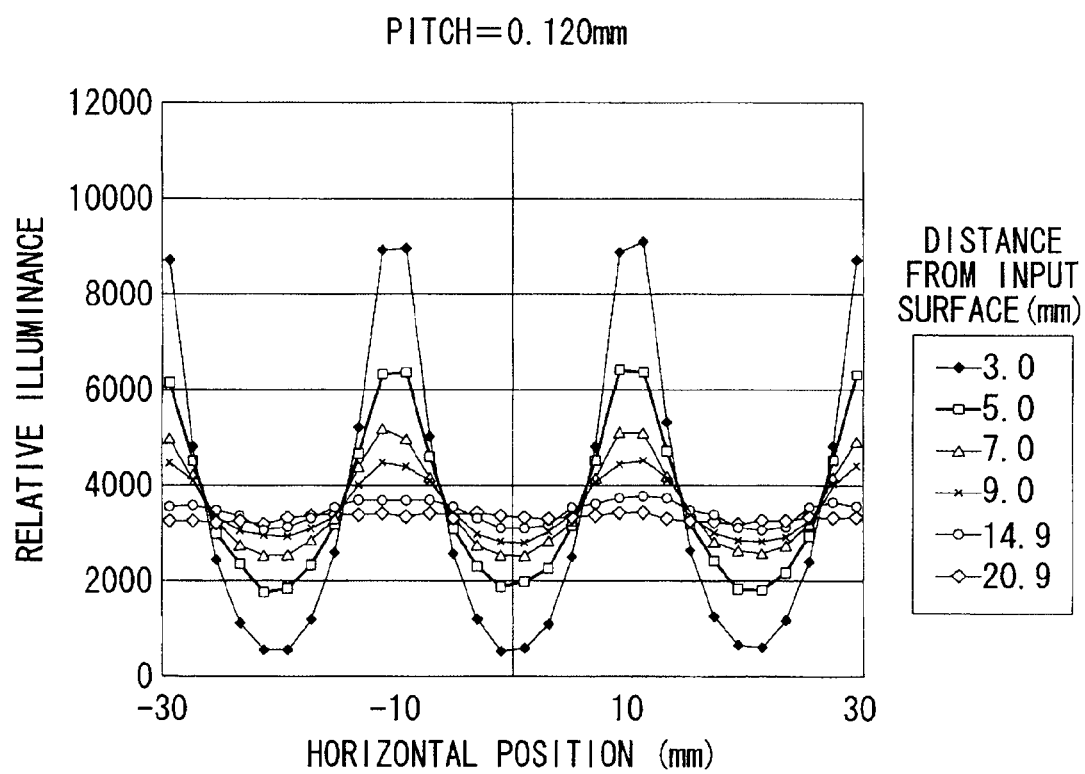

FIGS. 5 and 6 are diagrams showing results of the geometrical optics simulations. In each of FIGS. 5 and 6, a horizontal axis indicates a position in a horizontal direction (longitudinal direction) of the light entrance surface from a certain point on the light entrance surface, and a vertical axis indicates an amount of light received per unit area on the back surface of the light guide plate at each of points located inside the light guide plate at distances of 3.0 mm, 5.0 mm, ..., 20.9 mm, and the like from the light entrance surface, thereby showing a relative illuminance. In other words, this relative illuminance shows the luminance per unit area at each of those points in the case of viewing the light guide plate in a front view.

In the geometrical optics simulation herein, since four point light sources 1 are respectively arranged at four points (−30 mm, −10 mm, 10 mm, 30 mm) on the horizontal axis, the relative illuminance is high at these four points (front portion of point light source), and the relative illuminance is low in portions between these points (portion between the point light sources).

In FIG. 5, a pitch of the semicircular protrusion is 0.150 mm, and a flat portion not provided with the semicircular protrusion is 0.050 mm. As shown in FIG. 5, the relative illuminance of the front surface portion of the point light source (hereinafter referred to as "illuminance on the point light source front surface") at the point located 3 mm inside the light guide plate from the light entrance surface is not smaller than 10000, and the relative illuminance of the portion between the point light sources (hereinafter referred to as "illuminance between the point light sources") is 1000. In this case, a ratio of the illuminance between the point light sources to the illuminance on the point light source front surface (hereinafter referred to as "illuminance ratio") is smaller than 0.1. As opposed to this, as the distance from the light entrance surface to the inside of the light guide plate increase, the illuminance on the point light source front surface becomes lower, the illuminance between the point light sources becomes higher, and the illuminance ratio becomes larger and comes close to 1. That is, the relative illuminance becomes sufficiently uniform more in the inside of the light guide plate.

In FIG. 6, a pitch of the semicircular protrusion is 0.120 mm, and a flat portion not provided with the semicircular protrusion is 0.020 mm. That is, the flat portion according to FIG. 6 has a smaller width than that of the flat portion according to FIG. 5. Similarly to FIG. 5, FIG. 6 shows the tendency that the illuminance ratio becomes larger with increase in distance from the light entrance surface to the inside of the light guide plate. However, as a whole, the illuminance ratio according to FIG. 6 is larger than the illuminance ratio according to FIG. 5.

In this case, a frame of the liquid crystal display is determined by a distance between the end of an effective display area (area in which the relative illuminance inside the light guide plate is sufficiently uniform) and the light source, and the distance is desirably small from the view point of size reduction, and the like. Therefore, when the above illuminance ratio is close to 1 at a point closer to the light entrance surface, the end of the effective display area can be brought closer to the light source, so as to narrow the frame of the liquid crystal display. For this reason, the structure according to FIG. 6 (pitch of 0.120 mm, flat portion of 0.020 mm) is preferred to the structure according to FIG. 5 (pitch of 0.150 mm, flat portion of 0.050 mm).

Thereat, research has been conducted on what structure should be formed to make the illuminance ratio come close to 1 at a position closer to the light entrance surface. Specifically, the illuminance on the point light source front surface, the illuminance between the point light sources, and the illuminance ratio were studied in detail by increasing the number of samples of the pitch of the semicircular protrusion.

Figure 7:
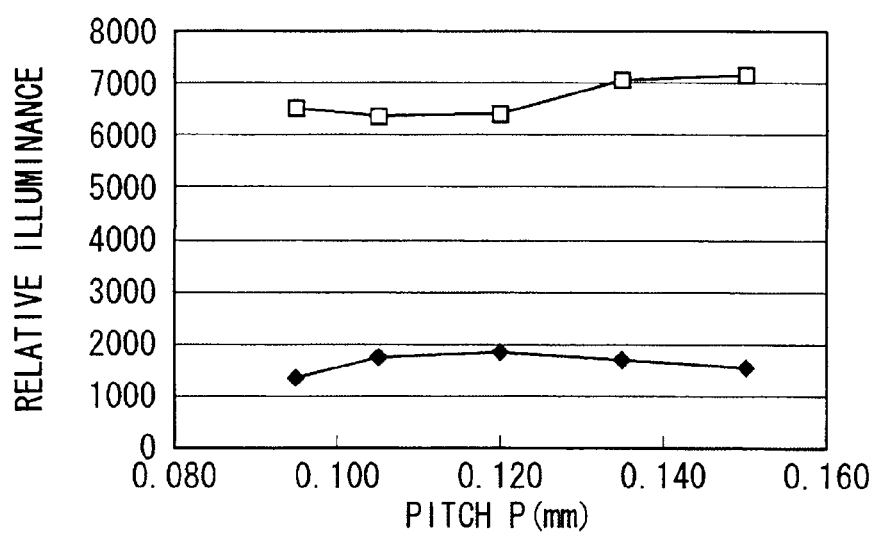
Figure 8:
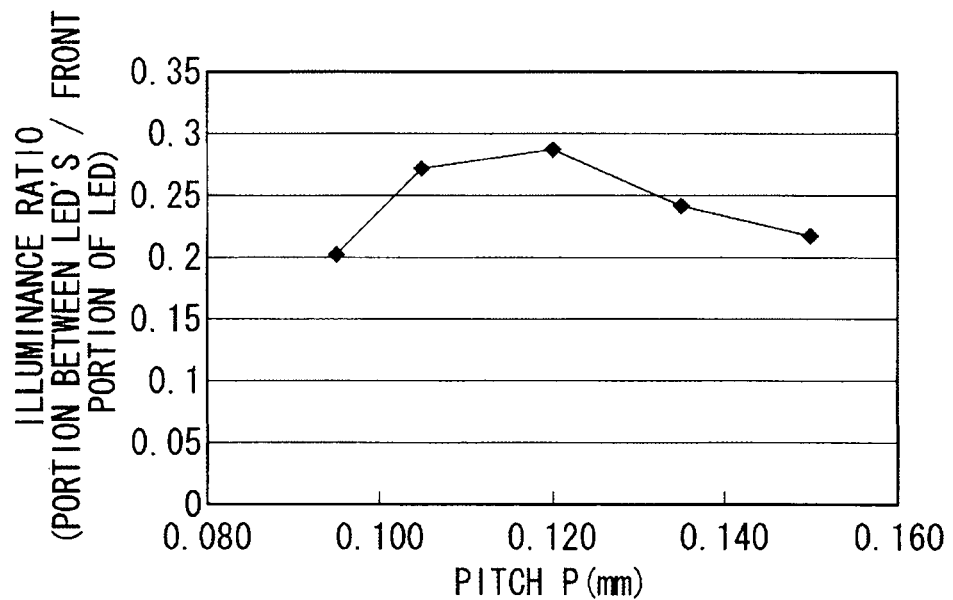

FIGS. 7 and 8 show the results thereof. FIG. 7 is a diagram showing an illuminance on the point light source front surface and the illuminance between the point light sources at a point located 5 mm inside the light guide plate from the light entrance surface, and FIG. 8 is a diagram showing an illuminance ratio at this time.

In FIG. 7, an upper line graph shows the illuminance on the point light source front surface, and a lower line graph shows the illuminance between the point light sources. As shown in FIG. 7, the illuminance on the point light source front surface is minimal and the illuminance between the point light sources is maximal when the pitch of the semicircular protrusion is 0.120 mm. As a result, the illuminance ratio is maximal when the pitch of the semicircular protrusion is 0.120 mm, as shown in FIG. 8.

The inventor has studied a variety of light paths from the point light sources to the light guide plate to examine the reason why the illuminance ratio becomes smaller in either case where the pitch becomes larger or smaller, as shown in FIG. 8. As a result, the following has been found. First, in the case of a small pitch (0.095 mm), even when light from the point light source is to be incident on the surface that greatly acts to refract light (substantially vertical surface almost vertical to the flat surface), the light is blocked by the adjacent semicircular protrusion as indicated by a dotted-line arrow Lx in FIG. 4. As a result, it has been found that light refraction is weakened in the case of the small pitch, because the light incident on the substantially vertical surface is reduced. On the other hand, in the case of a large pitch (0.150 mm), the number of semicircular protrusions decreases although a large amount of light is incident on the substantially vertical surface of one semicircular protrusion. Accordingly, as shown by an arrow Ld in FIG. 4, it has been found that light refraction is weakened in the case of the large pitch, because the amount of light passing through the flat section between the semicircular protrusions is relatively increased.

Figure 9:
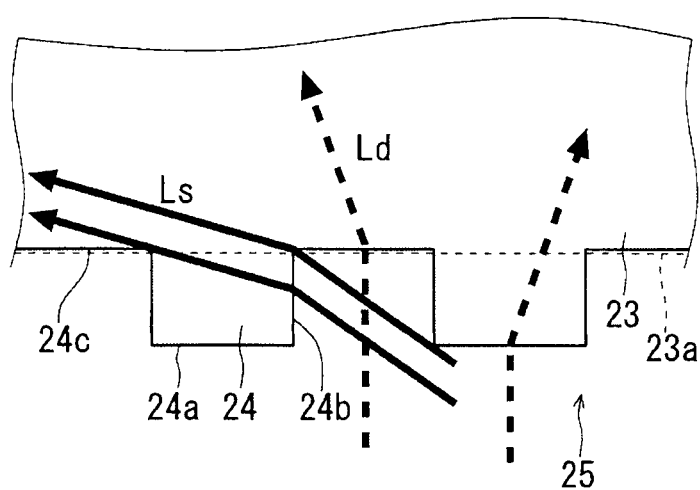
FIGS. 9 and 10 are diagrams each showing a light guide plate to be optimized.

Based on the above findings, the inventor has devised an illumination device having the following two features. As the first feature, as shown in FIG. 9, in a light guide plate 23 having rectangular unevenness 25 including a side surface 24b that greatly acts to refract light, an optimal pitch P, height H, and width W of a protrusion 24 were obtained so as to maximize an amount of incident light on the side surface 24b, and these were applied to the light guide plate 2. Then, as the second feature, in order that light is dispersed on the top surface 20a and the bottom surface 20c, a dispersion structure including the plurality of semicircular protrusions 31 is provided on the top surface 20a and the bottom surface 20c. It should be noted that light inside the light guide plate 2 preferably exits the light guide plate 2 after being totally reflected on the light exit surface 2b and the back surface 2c sufficiently and repeatedly. Thereat, in the present preferred embodiment, as described above, the light guide plate 2 is configured so as to make the protrusions 20 extend in the direction perpendicular to the light exit surface 2b such that the light sufficiently propagates inside the light guide plate 2 and does not exit the light guide plate 2 before being sufficiently dispersed.

Figure 10:
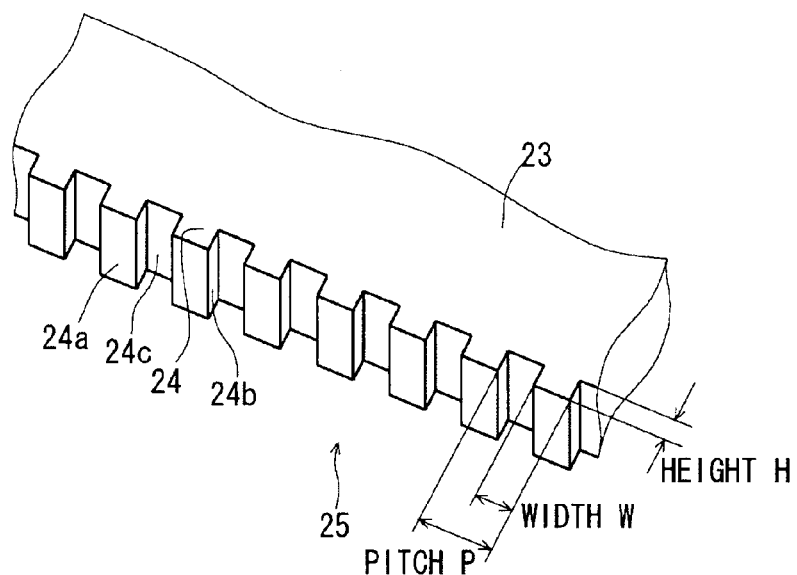

Next, the above first feature, namely, the optimization of the pitch P, the height H, and the width W of the protrusion 24 in the light guide plate 23 having the rectangular unevenness 25 will be described. FIG. 10 is a diagram showing a model of the light guide plate 23 on which a geometrical optics simulation for the optimization has been performed. In this model, while a condition that a thickness of the light guide plate 23 is 2 mm and a condition that the pitch P of the protrusions 24 is 0.10 mm were held unchanged, the height H (width of the side surface 24b) and the width W (width of the top surface 24a, namely a difference between the pitch P and the width of the bottom 24c) of the protrusions 24 were changed. How a relative illuminance and the like change in this case was studied by geometrical optics simulation.

Figure 11:
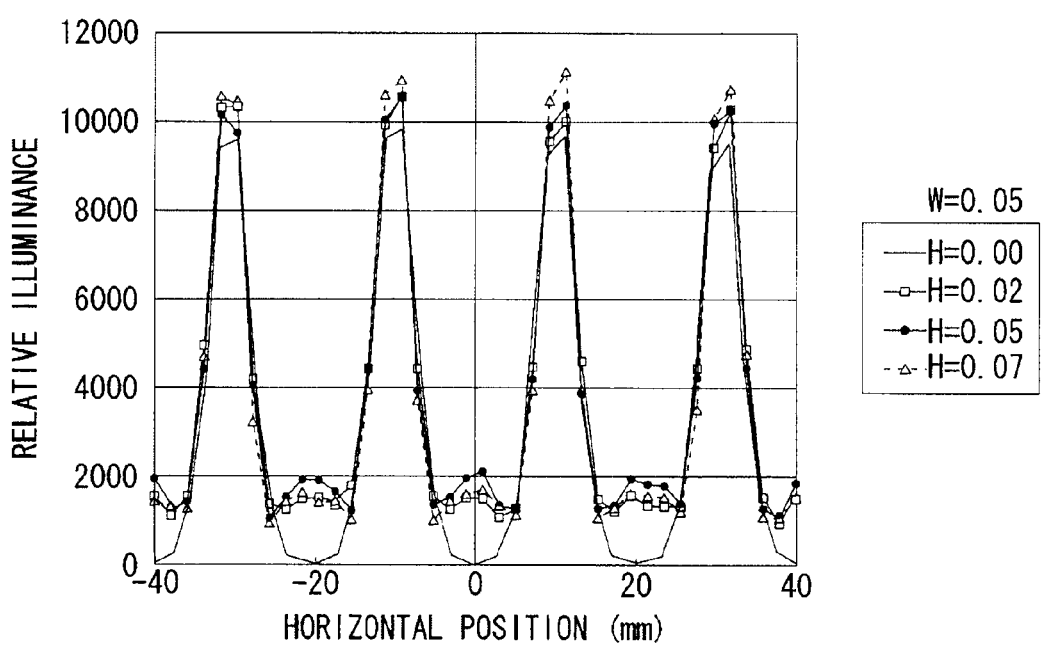
FIGS. 11 to 13 are diagrams each showing a result of geometrical optics simulations of the light guide plate to be optimized.

FIG. 11 is a diagram showing a result of the geometrical optics simulation. FIG. 11 shows a relative illuminance at a point located 5 mm inside the light guide plate 2 from the light entrance surface 23a. As shown in FIG. 11, a peak has been generated in the front portion of the point light sources by light incident from the side surface 24b.

Figure 12:
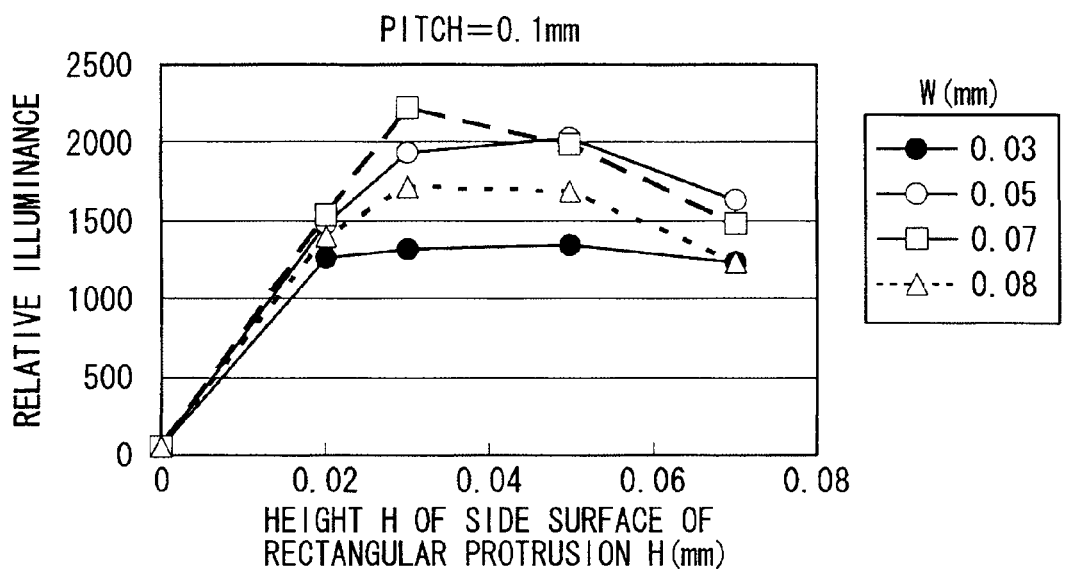
Figure 13:
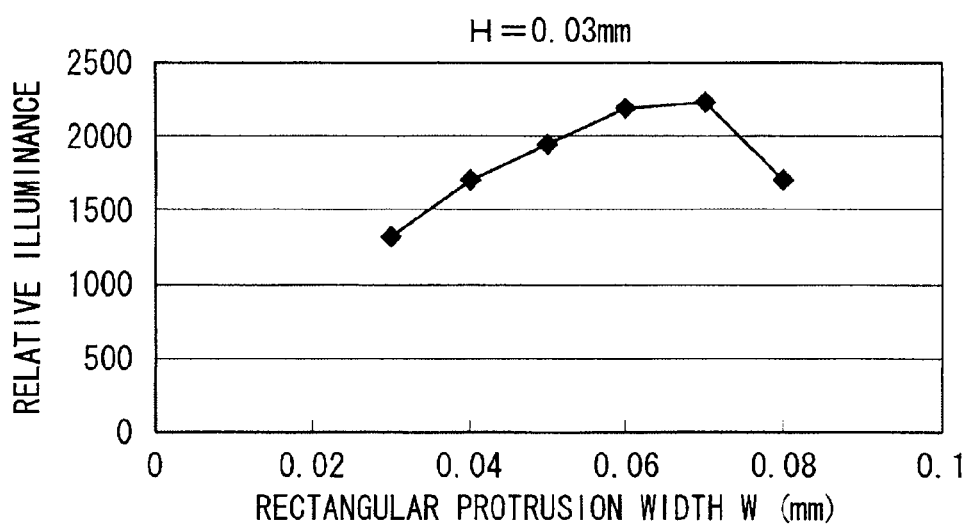

FIG. 12 is a diagram showing an illuminance between the point light sources at the time when the number of samples of the height H and the width W of the protrusion 24 are increased. FIG. 13 is a diagram showing an illuminance between the point light sources at the time of setting the height H of the protrusion 24 to 0.03 mm. As shown in FIGS. 12 and 13, the illuminance between the point light sources is high around H/P=0.25 to 0.6 and W/P=0.5 to 0.75, and has a peak at H/P=0.3 and W/P=0.7.

The reason why the peak is generated herein is because, when the height H of the protrusion 24 is excessively small, the amount of light incident on the side surface 20b decreases due to a decrease in area of the side surface 24b that greatly acts to refract light, whereas when the height H of the protrusion 24 is excessively large, the amount of light incident on the side surface 24b decreases due to a light shielding effect of the adjacent protrusion 24. Further, when the width W of the protrusion 24 is excessively small, the amount of light incident on the side surface 24b decreases due to a decrease in the number of protrusions 24, whereas when the width W of the protrusion 24 is excessively large, the amount of light incident on the side surface 24b decreases due to the light shielding effect of the adjacent protrusion 24.

Taking the above into consideration, when a pitch, a height, and a width of each of the plurality of protrusions 20 are P, H, and W, respectively, H/P is most suitably about 0.3 and W/P is about 0.7. However, the dependency is relatively low, and the illuminance ratio is not smaller than 90% of the peak value when H/P is about 0.25 to 0.6 and W/P is about 0.5 to 0.75. However, in the case of exceeding this range, the illuminance ratio rapidly increases, and a difference in size of reflection dot required for eliminating the difference in luminance increases. Accordingly, it is difficult to accurately form a small reflection dot in this case.

Figure 14:
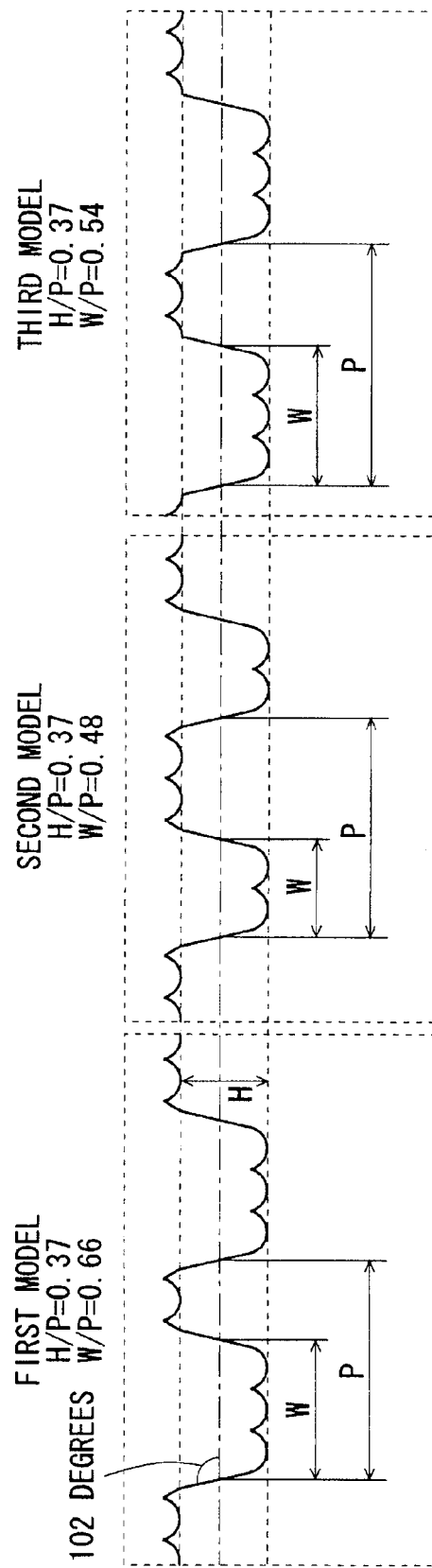
FIGS. 14A to 14C are diagrams showing the configuration of the illumination device according to the first preferred embodiment.

Next, the above second feature, namely provision of the plurality of semicircular protrusions 31 on the top surface 20a and the bottom surface 20c, will be described. FIGS. 14A to 14C are diagrams showing models of the light guide plate 2 subjected to the geometrical optics simulation. Specifically, the geometrical optics simulation was performed in a manner similar to the above on a first model where H/P=0.37 and W/P=0.66 shown in FIG. 14A, a second model where H/P=0.37 and W/P=0.48 shown in FIG. 14B, and a third model where H/P=0.37 and W/P=0.54 shown in FIG. 14C. In any of the first to third models, an angle formed by the side surface 20b and the bottom surface 20c was set to 102 degrees.

Figure 15:
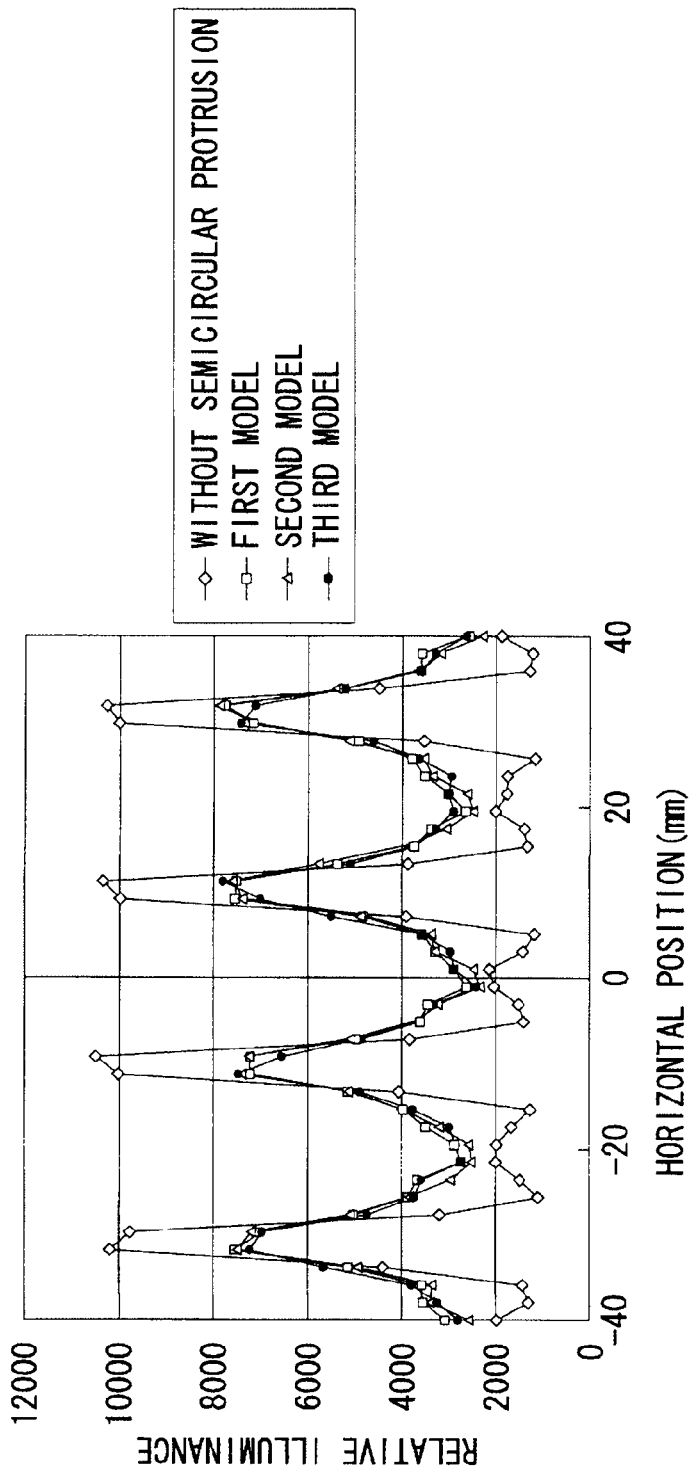
FIG. 15 is a diagram showing a result of geometrical optics simulations of the illumination device according to the first preferred embodiment.

FIG. 15 is a diagram showing a result obtained by performing the geometrical optics simulation on a model without the semicircular protrusion 31 and the first to third models provided with the semicircular protrusion 31. In any of the first to third models, the illuminance on the point light source front surface is low and the illuminance between the point light sources is high as compared with the model without the semicircular protrusion 31, and the illuminance ratio can also be set to as high as the order of 0.35. That is, the difference between the illuminance on the point light source front surface and the illuminance between the point light sources has been suppressed, and variations in luminance in the vicinity of the light entrance surface 2a of the light guide plate 2 are suppressed.

In accordance with the illumination device according to the present preferred embodiment described above, each of the top surface 20a and the bottom surface 20c of the unevenness 21 is provided with the micro protrusion 30 such as the semicircular protrusion 31. It is therefore possible to sufficiently refract light from the point light source 1 on each of the top surface 20a and the bottom surface 20c, so as to suppress the difference between the illuminance of the front portion of the point light source and the illuminance of the portion between the point light sources on the light entrance surface 2a. That is, it is possible to suppress variations in luminance in the vicinity of the light entrance surface 2a of the light guide plate 2. This is particularly effective when the number of point light sources 1 is small and the interval between the point light sources 1 is large.

Further, in accordance with the illumination device according to the present preferred embodiment, when a pitch, a height, and a width of each of the plurality of protrusions 20 are P, H, and W, respectively, H/P is not smaller than 0.25 and not larger than 0.6, and W/P is not smaller than 0.5 and not larger than 0.75. Hence, it is possible to reliably suppress variations in luminance in the vicinity of the light entrance surface 2a of the light guide plate 2.

Figure 16A:
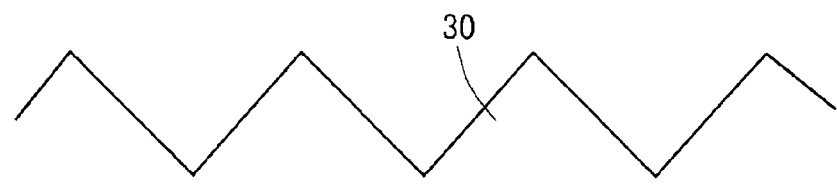
FIGS. 16A to 16E are diagrams showing the configuration of the illumination device according to the first preferred embodiment.
Figure 16B:
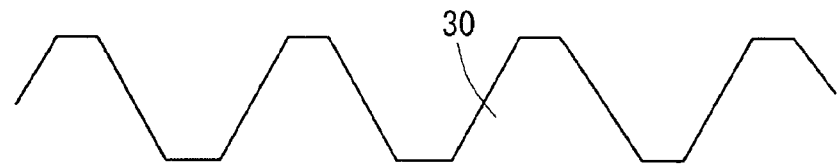
Figure 16C:
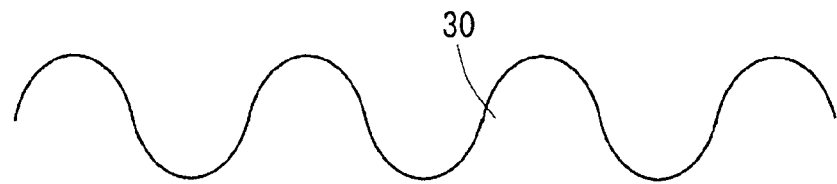
Figure 16D:
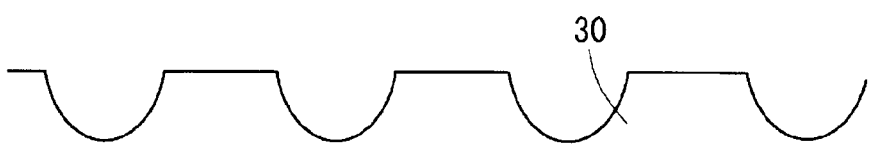
Figure 16E:
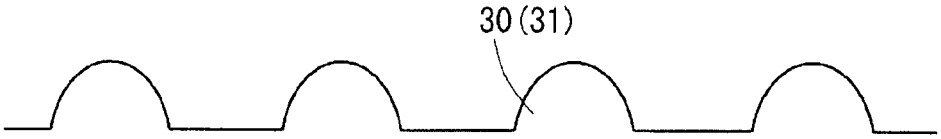

It should be noted that the micro protrusion 30 provided on each of the top surface 20a and the bottom surface 20c of the unevenness 21 is not limited to the semicircular protrusion 31 described above. For example, in place of the semicircular protrusion 31, when the micro protrusion 30 is a protrusion having a triangular shape as shown in FIG. 16A, a protrusion having an isosceles trapezoidal shape as shown in FIG. 16B, a protrusion included in a continuous curved surface as shown in FIG. 16C, or a protrusion having a flat top surface and connected to a curved surface as shown in FIG. 16D, the variations in luminance in the vicinity of the light entrance surface 2a of the light guide plate 2 can be expected to be suppressed as in the semicircular protrusion 31. Further, as shown in FIG. 16E, the semicircular protrusion 31 may be provided spaced apart from one another.

Second Preferred Embodiment

FIG. 17 is a top view showing a configuration of a light guide plate provided in an illumination device according to a second preferred embodiment of the present invention. Hereinafter, in the illumination device according to the present preferred embodiment, components similar to those of the illumination device according to the first preferred embodiment are denoted with the same reference numerals, and descriptions will be given mainly on portions different from the illumination device according to the first preferred embodiment.

As shown in FIG. 17, in a manner similar to the first preferred embodiment, the light entrance surface 2a of the light guide plate 2 according to the present preferred embodiment is provided with the unevenness 21 formed by arraying the plurality of protrusions 20 at predetermined pitches, and the bottom surface of the unevenness 21 is provided with the plurality of semicircular protrusions 31. The present preferred embodiment is different from the first preferred embodiment in that the top surface 20a of each of the protrusions 20 has a single semicircle shape in a plan view of the light guide plate 2 according to the present preferred embodiment. Hereinafter, the protrusion 20 may be referred to as macro semicircular protrusion 20 in the present preferred embodiment.

FIG. 18 is a diagram showing a result of a geometrical optics simulation in a case where the semicircular protrusion 31 has a pitch of 42 μm, a radius of 21 μm, and a height of 20.7 μm, and the macro protrusion 20 has a pitch of 210 μm, a radius of 42.6 μm, a height of 120 μm, a width of 100 μm, and a side surface at an inclination angle of 12 degrees. An illuminance ratio obtained from this result is on the order of 0.33, and can thus be made as high as a similar level of the first preferred embodiment. That is, the difference between the illuminance on the point light source front surface and the illuminance between the point light sources is suppressed also in the illumination device according to the present preferred embodiment.

In accordance with the illumination device according to the present preferred embodiment described above, the bottom surface 20c of the unevenness 21 is provided with the micro protrusion 30 such as the semicircular protrusion 31, and the top surface 20a of the protrusion 20 is formed in a single semicircle shape. It is therefore possible to sufficiently refract light from the point light source 1 on each of the top surface 20a and the bottom surface 20c, whereby variations in luminance in the vicinity of the light entrance surface 2a of the light guide plate 2 can be suppressed, as in the first preferred embodiment. This is particularly effective when the number of point light sources is small and the interval between the point light sources 1 is large. Further, with the protrusion 20 having a relatively large semicircular shape, transcriptional properties in the case of projection-molding the light guide plate 2 can be improved, and manufacturing of the light guide plate 2 can be facilitated.

It is to be noted that in the first and second preferred embodiments, the structure of the macro protrusion 20 is changed in accordance with the positional relation between the micro protrusion 20 and the point light source 1 so that variations in luminance can be suppressed. For example, by narrowing the pitch between the macro protrusions 20 in the front surface portion of the point light source, and widening the pitch between the macro protrusions 20 in the portion between the point light sources, lowering of luminance in the portion between the point light source can be suppressed, and the luminance in the vicinity of the light entrance surface 2a can be made uniform.

Third Preferred Embodiment

Figure 19:
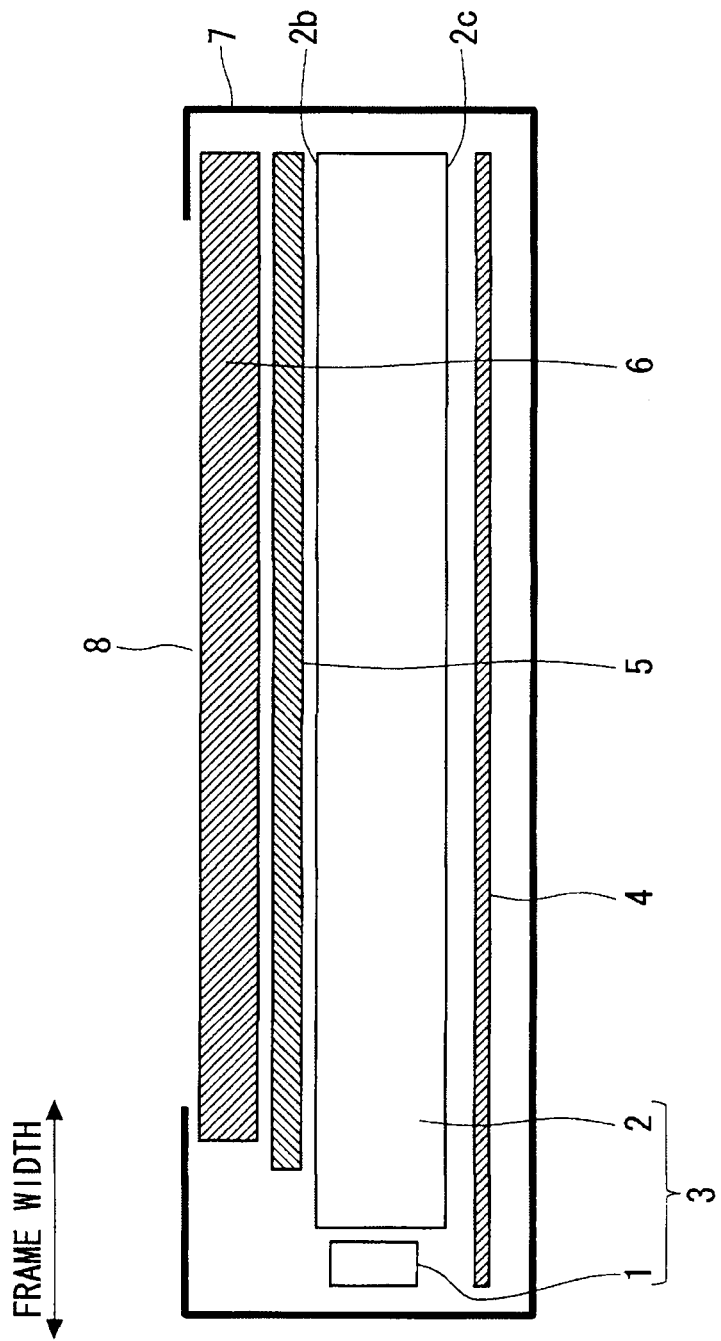
FIG. 19 is a sectional view showing a configuration of a liquid crystal display according to a third preferred embodiment.

FIG. 19 is a sectional view showing a configuration of a liquid crystal display according to a third preferred embodiment of the present invention. As shown in FIG. 19, a liquid crystal display according to the present preferred embodiment includes an illumination device 3 having the point light source 1 and the light guide plate 2 described in the first and second preferred embodiments, a reflection sheet 4 provided along the back surface 2c of the light guide plate 2, an optical sheet 5 and a liquid crystal panel 6 sequentially provided on the upper side of the light exit surface 2b of the light guide plate 2, and a case 7 including these. The case 7 is provided with an opening 8 that exposes the liquid crystal panel 6, and a distance between the end of the opening 8 and the end of the case 7 is a frame width.

In accordance with the liquid crystal display according to the present preferred embodiment, the illumination device according to the first and second preferred embodiments is provided. Since variations in luminance in the vicinity of the light entrance surface 2a of the light guide plate 2 is suppressed as described above, the frame width of the liquid crystal display can be made small.

While the invention has been shown and described in detail, the above description is in all aspects illustrative and not restrictive. It is therefore understood that numerous modifications and variations can be devised without departing from the scope of the invention.

What is claimed is:

1. An illumination device, comprising:
   a point light source; and
   a light guide plate having a lateral face serving as a light entrance surface opposed to said point light source, and a main surface serving as a light exit surface, wherein said light entrance surface of said light guide plate is provided with unevenness formed by arraying at predetermined pitches a plurality of first protrusions each projecting from said light entrance surface and extending in a direction perpendicular to said light exit surface, said unevenness has first top surfaces, and second top surfaces, and side surfaces, each of said first and second top surfaces being in the direction perpendicular to said light exit surface, each of said first top surfaces being closer than each of said second top surfaces to a center of said light exit surface, each of said first top surfaces being in between said plurality of first protrusions, each of said side surfaces connecting said first top surface and said second top surface, each of said first and second top surfaces being provided with a plurality of second protrusions, each of said plurality of second protrusions extending in the direction perpendicular to said light exit surface and having a height smaller than each of said plurality of first protrusions, the position of each of tips of said second protrusions in the direction vertical to said light entrance surface is aligned, and each of said side surfaces is flat by means of not being provided with said plurality of second protrusions.

2. The illumination device according to claim 1, wherein in the plan view in the direction perpendicular to said light exit surface of said light guide plate, each of said plurality of second protrusions has a semicircular shape of an identical size.

3. The illumination device according to claim 1, wherein an angle formed by side surfaces connecting said second top surfaces and said first top surfaces of said unevenness is larger than 90 degrees and smaller than 110 degrees.

4. An illumination device, comprising:
a point light source; and
a light guide plate having a lateral face serving as a light entrance surface opposed to said point light source, and a main surface serving as a light exit surface, wherein
said light entrance surface of said light guide plate is provided with unevenness formed by arraying at predetermined pitches a plurality of first protrusions each projecting from said light entrance surface and extending in a direction perpendicular to said light exit surface,
said unevenness has first top surfaces, second top surfaces, and first side surfaces, each of said first and second top surfaces being in the direction perpendicular to said light exit surface, each of said first top surfaces being closer than each of said second top surfaces to a center of said light exit surface, each of said first top surfaces being in between said plurality of first protrusions, each of said first side surfaces connecting said first top surface and said second top surface,
each of said first top surfaces being provided with a plurality of second protrusions, each of said plurality of second protrusions extending in the direction perpendicular to said light exit surface and having a height smaller than each of said plurality of first protrusions,
an angle formed by a surface of a semicircular molding part of a first top surface molding part and a surface of a second side surface molding part is not smaller than 60 degrees,
in a plan view in the direction perpendicular to said light exit surface of said light guide plate, each of said second top surfaces of said plurality first protrusions has only a single semicircular shape, and each of said plurality of second protrusions has a semicircular shape of an identical size, and
each of said first side surfaces is flat by means of not being provided with said second protrusions.

5. The illumination device according to claim 4, wherein an angle formed by side surfaces connecting said second top surfaces and said first top surfaces of said unevenness is larger than 90 degrees and smaller than 110 degrees.

6. A liquid crystal display comprising:
an illumination device, wherein
said illumination device includes
a point light source, and
a light guide plate having a lateral face serving as a light entrance surface opposed to said point light source, and a main surface serving as a light exit surface,
wherein said light entrance surface of said light guide plate is provided with unevenness formed by arraying at predetermined pitches a plurality of first protrusions each projecting from said light entrance surface and extending in a direction perpendicular to said light exit surface,
said unevenness has first top surfaces, second top surfaces, and side surfaces, each of said first and second top surfaces being in the direction perpendicular to said light exit surface, each of said first top surfaces being closer than each of said second top surfaces to a center of said light exit surface, each of said first top surfaces being in between said plurality of first protrusions, each of said side surfaces connecting said first top surfaces and said second top surfaces,
each of said first and second top surfaces being provided with a plurality of second protrusions, each of said plurality of second protrusions extending in the direction perpendicular to said light exit surface, and having a height smaller than each of said plurality of first protrusions,
the position of each of tips of said second protrusions in the direction vertical to said light entrance surface is aligned, and
each of said side surfaces is flat by means of not being provided with said plurality of second protrusions.

7. The illumination device according to claim 2, wherein each of said plurality of second protrusions have a semicircular shape with a radius between 10 and 20 μm, and
an angle formed by a surface of a semicircular molding part of a first top surface molding part and a surface of a side surface molding part is larger than 60 degrees.

* * * * *